United States Patent [19]

Häfele

[11] Patent Number: 5,505,911
[45] Date of Patent: Apr. 9, 1996

[54] CATALYTIC CONVERTER

[75] Inventor: Edelbert Häfele, Karlsruhe, Germany

[73] Assignee: Roth-Technik GmbH & Co. Förschung Für, Gaggenau, Germany

[21] Appl. No.: 405,973

[22] Filed: Mar. 17, 1995

Related U.S. Application Data

[63] Continuation-in-part of Ser. No. 108,734, Aug. 27, 1993, abandoned.

[30] Foreign Application Priority Data

Mar. 28, 1991 [DE] Germany .......................... 41 10 395.5

[51] Int. Cl.⁶ ............................................ F01N 3/10
[52] U.S. Cl. .................. 422/174; 422/173; 422/177; 422/180; 422/199; 422/211; 422/222; 60/300; 502/527; 219/552; 219/543
[58] Field of Search .................. 422/174, 171, 422/180, 173, 177, 198, 199, 222, 211; 502/439, 527; 219/543, 552, 553; 392/450, 491, 494, 490; 60/299, 300, 303

[56] References Cited

U.S. PATENT DOCUMENTS

| 3,768,982 | 10/1973 | Kitzner et al. | 422/174 |
| 3,770,389 | 10/1973 | Kitzner et al. | 422/174 |
| 4,976,929 | 12/1990 | Cornelison et al. | 422/174 |
| 5,094,074 | 3/1992 | Nishizawa et al. | 422/174 |

FOREIGN PATENT DOCUMENTS 4017360  12/1991  Germany .

*Primary Examiner*—Robert J. Warden
*Assistant Examiner*—Hien Tran
*Attorney, Agent, or Firm*—Max Fogiel

[57] ABSTRACT

There is provided a start-up catalyzer for catalyzing exhaust gas from an internal combustion engine in which flat and corrugated sheets are disposed in alternating relation. Some of the flat sheets have an electrically conductive resistance-heating layer which may be catalytically active and in form of a plurality of rosette-shaped conductive loops connected in series.

4 Claims, 3 Drawing Sheets

CATALYTIC CONVERTER

The present application is a continuation-in-part of the parent application Ser. No. 108,734, filed Aug. 27, 1993, now abandoned.

BACKGROUND OF THE INVENTION

Many types of catalyzer for catalyzing the exhaust from internal-combustion engines are known. They include a housing that accommodates a ceramic monolith. The monolith is honeycombed with channels. The whole surface of the monolith, including that of the channels, is coated with catalyst.

Although such catalyzers have been demonstrated reliable, they do have a drawback in that the catalyst does not eliminate pollutants while the engine is starting cold. At that moment the temperature of the exhaust is approximately 100° C. The catalyzer is just coming into action and cannot operate at full capacity below approximately 400° C. A motor vehicle will accordingly emit considerable pollution while it is being cold started.

A heated catalyzer is known from German 4 017 360 A1. The catalyzer illustrated in FIG. 1 includes a separate upstream heating element that parallels the entire path of flow. The heating element 4 in the embodiment illustrated in FIG. 2 parallels only part of the path. The embodiment illustrated in FIG. 3 includes a ceramic support. An electrically conductive coating 6 is sandwiched between the wall 5 of the support and an intermediate washcoat 8. To maintain a constant current through lines 12 (+V) and 7 it is absolutely essential for the adjacent areas, specifically wall 5 and washcoat 8, to be electrically insulating.

What are called start-up catalyzers, intended to eliminate the aforesaid drawback, are known (German GM 1 810 816). The catalyst is applied not to a ceramic monolith but to a metal support called a metallith. The device comprises a honeycomb of sheets of textured metal with a number of parallel channels for the exhaust to flow through. The metallith is coated with a ceramic catalyst. The metallith is heated and conducts heat to the catalyst.

The direct electrical heating of a catalyst support, however, has encountered several obstacles in that the usual metal structures are not electrically resistant enough to be employed as is for heating elements at the voltages conventionally available in motor vehicles (German Patent 563 757). Attempts have accordingly also been directed at heating the catalyzer with a separate electrical heating element (German AS 2 230 663) that does not itself act as a support. GM 8 905 073.8 discloses that 12 V of electricity can be supplied in a conventional automotive system only when the honeycomb is very complex. Such complexity of course makes the devices expensive at the very least.

Consequently both the catalyst itself and the metallith must be heated. Furthermore, since metal conducts heat very efficiently and accordingly demands considerable power, the discontinuously introduced energy will propagate very rapidly by conduction and obvious maximal temperatures will be prevented. This advantage, however, basically entails the drawback that such catalysts divert heat even in normal operation and accordingly cool off very rapidly, so that the requisite operating temperatures are soon not achieved when the exhaust is relatively cool, during idling for example (German GM 8 905 073.8).

SUMMARY OF THE INVENTION

The object of the present invention is start-up catalyzer that will not exhibit the aforesaid drawbacks of metallith catalyzers, that will rapidly achieve operating readiness, and that will demand little electrical power.

At least some of the surface of the support is accordingly coated with at least one electrically conductive resistance-heating layer. The substance can be platinum, a metal of the platinum group such as ruthenium, rhodium, or palladium, an alloy of platinum-group metals, or such a conductive metal oxide as titanium, nickel, cobalt, manganese, zinc, or copper oxide, niobium pentoxide, or tin dioxide. The resistance-heating layer can, if it is a layer of one of the aforesaid platinum-group metals, itself constitute the catalyst. The resistance-heating layer is briefly electrically heated during start-up. Catalysis will accordingly begin immediately at the rapidly heated surface. The area of the support or catalytic layer adjacent to the resistance-heating layer will then be heated by conduction, so that this residual area will also become active. The process will be supported by the carbon monoxide that occurs at higher during start-up and reacts exothermally with the resistance-heating layer, promoting heating of that area as well. It is accordingly only the actual catalytically active layer that is concomitantly heated in accordance with the present invention and not the support for example. Heating is accordingly more rapid and requires less power. The resistance-heating layer can either be applied directly to a ceramic support or to an electrically insulating and preferably poorly heat-conducting ceramic layer on a metal support.

The support will preferably be a honeycomb, with channels of polygonal—square, hexagonal, or octagonal for example—or even round or semicircular cross-section.

The resistant region of the resistance-heating layer can be prepared and simply shaped to ensure a wide range of resistance, preferably 0.01 to 2 $\Omega$. The method of manufacture, impregnation for example, facilitates compliance with precise specifications with no need to vary the shape of the honeycomb.

When the resistance-heating layer is applied to the support upstream in terms of the flow of exhaust as in one practical embodiment, the catalytically active layer will promote heating of the rest of the surface of the support even more extensively in that the exhaust itself will convey heat to the rest of the catalyzer.

Further practical embodiments and advanced versions of the present invention will be evident from the subsidiary claims.

BRIEF DESCRIPTION OF THE DRAWINGS

The invention will now be specified with reference to the accompanying drawing, wherein.

DESCRIPTION OF THE PREFERRED EMBODIMENTS

Figure 1:
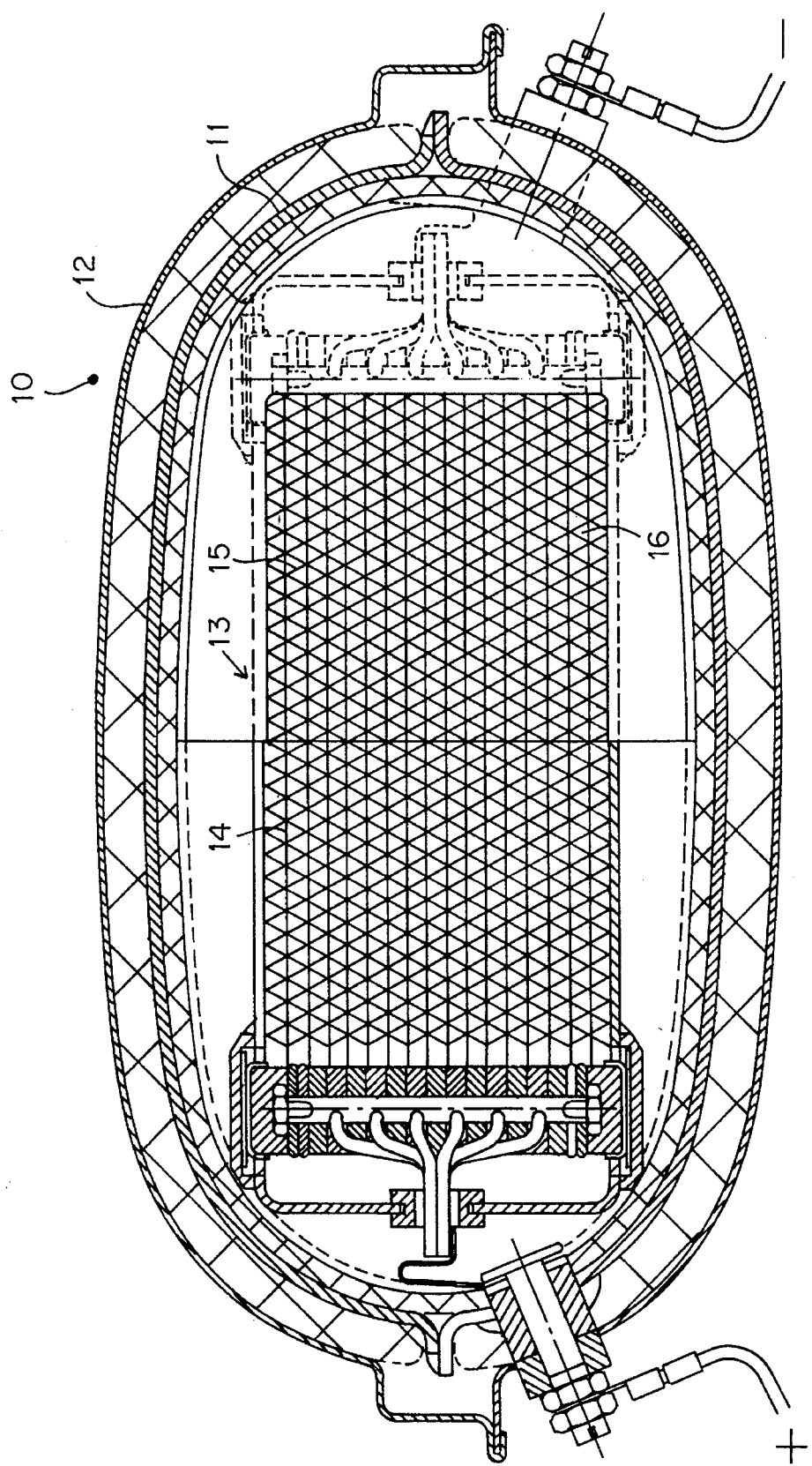
FIG. 1 is a schematic cross-section through a catalyzer.

The catalyzer 10 illustrated in FIG. 1 is intended for scrubbing the exhaust from an internal-combustion engine. It is entirely encapsulated in an inner housing 11 and an outer housing 12. The exhaust flows through a support 13 accommodated in inner housing 11 and protected from vibration by a resilient lining for example. The actual catalyst is applied to the surface of support 13.

Support 13 is composed of a number of flat parallel sheets 14 and 15 of metal. Each pair of adjacent sheets is, as illustrated in FIG. 1, connected by a corrugated sheet leaving a number of parallel channels 16 for the exhaust to flow through. The undulations in the corrugated sheets are perpendicular to the plane of projection of FIG. 1. The surfaces of the corrugated sheets and of flat sheets 14 and 15 that constitute the inner surface of the channels are coated with a layer of catalyst that reacts with the exhaust, particles of platinum and/or platinum-group metal embedded in aluminum oxide for instance.

Figure 2:
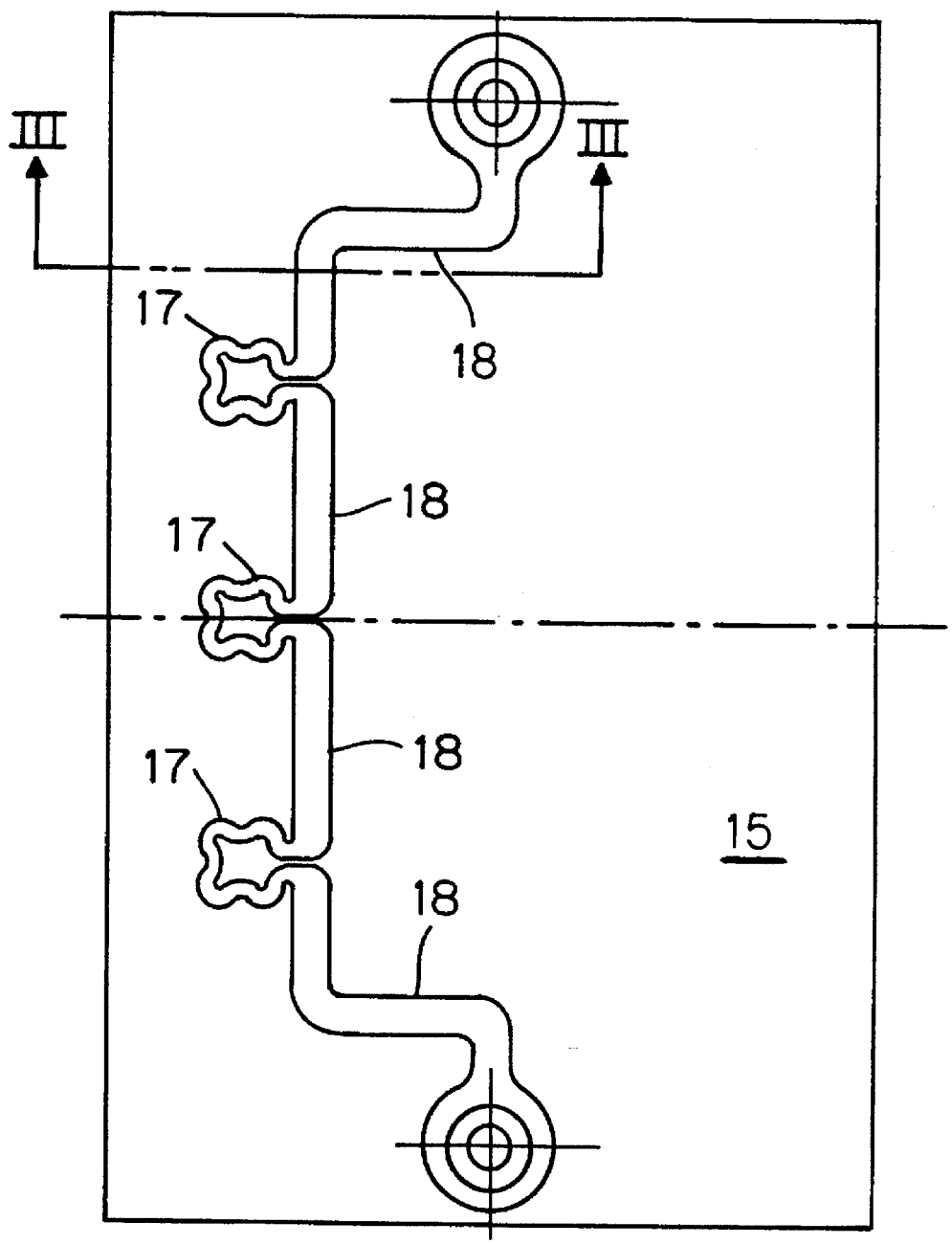
FIG. 2 is a top view of a sheet of metal from the catalyzer illustrated in FIG. 1.
Figure 3:
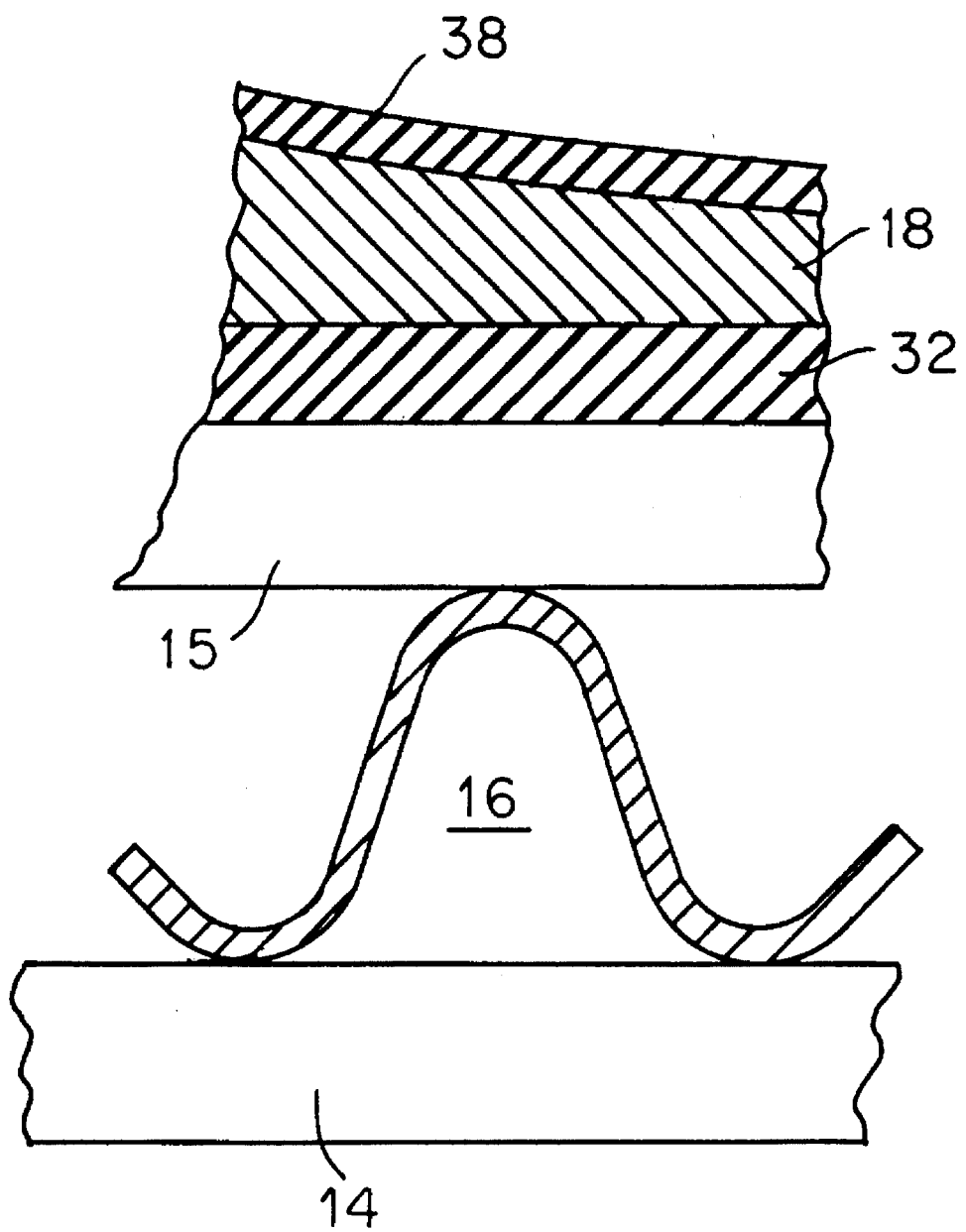
FIG. 3 is a section along the line III—III in FIG. 2.

The metal sheets 15 in the embodiment illustrated in FIG. 2 have an electrically conductive resistance-heating layer that is preferably simultaneously catalytically active. Layer has been screen-printed in the form of a thick layer onto a layer of electrical insulation 32. Metal sheets 14 lack resistance-heating layer and have, as illustrated in FIG. 3, only a catalytically active layer. Another catalytically active layer, preferably in the form of a coating on the other catalytically active layer can be applied to sheets 15.

Resistance-heating layer preferably covers the sheets 15 and does not extend all the way along them. It is connected through a series of rosettes 17, as viewed from above, by way of electrically effectively conducting communicating layers 18 and extends to the edges of sheets 15 forming a series circuit. The resistance-heating layers can also be omega-shaped and symmetrical or, to ensure unequal distribution of heat and take non-uniform exhaust flow into account, asymmetrical.

FIG. 3 is a schematic representation of the cross-section. A sheet 15 of metal is coated with an electrically insulating intermediate layer 32. Layer 32 is coated with an electrically conductive resistance-heating layer 18. Layer 18 can either be catalytically active or be coated with an electrically non-conductive but catalytically active layer 38.

I claim:

1. A start-up catalyzer for an exhaust from an internal combustion engine, comprising:

a housing;

a metallic support in form of a honeycomb structure disposed within said housing; said metallic support having a plurality of parallel channels being formed by alternating superimposed flat and corrugated metal sheets; and an electrically conductive resistance-heating layer disposed on every other flat metal sheet; said electrically conductive resistance-heating layer being catalytically active;

wherein said electrically conductive resistance-heating layer comprises a plurality of rosette-shaped conductive loops connected in series by substantially straight-lined electrically conductive resistance-heating strips to form a series circuit.

2. A start-up catalyzer as defined in claim 1, further comprising an intermediate electrically insulating layer disposed between said every other flat metal sheet and said electrically conductive resistance-heating layer.

3. A start-up catalyzer for an exhaust from an internal combustion engine, comprising:

a housing;

a metallic support in form of a honeycomb structure disposed within said housing; said metallic support having a plurality of parallel channels being formed by alternating superimposed flat and corrugated metal sheets; each of said flat and corrugated sheets being coated with a catalytically active layer; and an electrically conductive resistance-heating layer disposed on every other flat metal sheet and the catalytically active layer;

wherein said electrically conductive resistance-heating layer comprises a plurality of rosette-shaped conductive loops connected in series by substantially straight-lined electrically conductive resistance-heating strips to form a series circuit.

4. A start-up catalyzer as defined in claim 5, further comprising an intermediate electrically insulating layer disposed between said every other flat metal sheet and said electrically conductive resistance-heating layer.

* * * * *